Oct. 27, 1953     N. F. SLACK     2,656,741
WATCHMAKER'S TOOL
Filed April 6, 1950
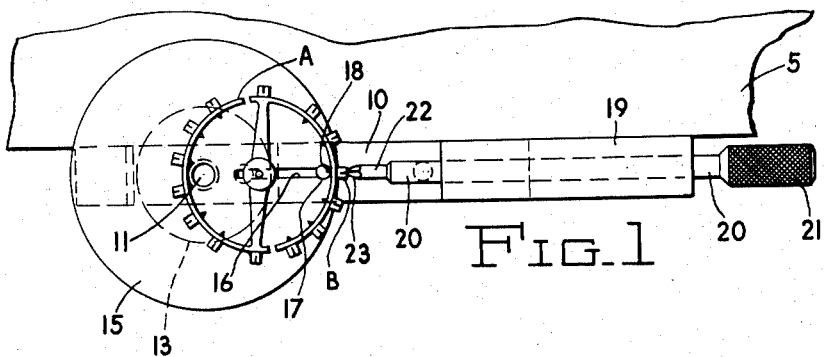
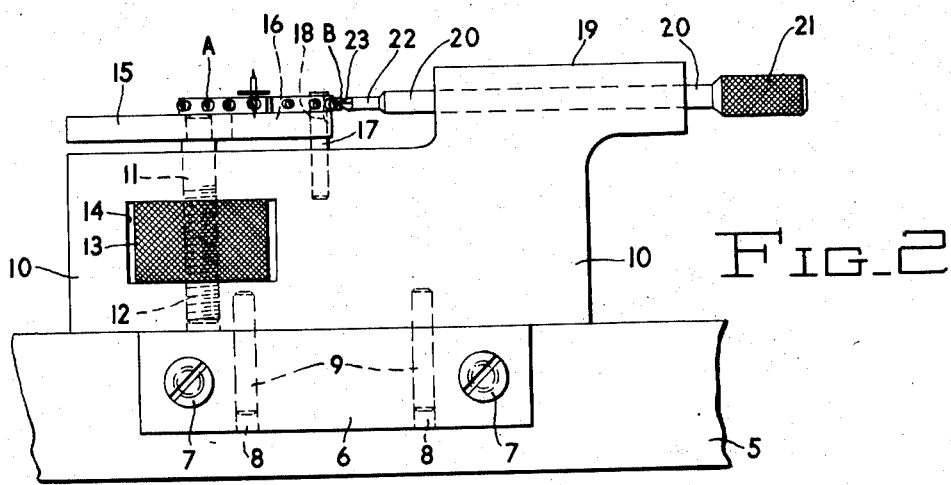
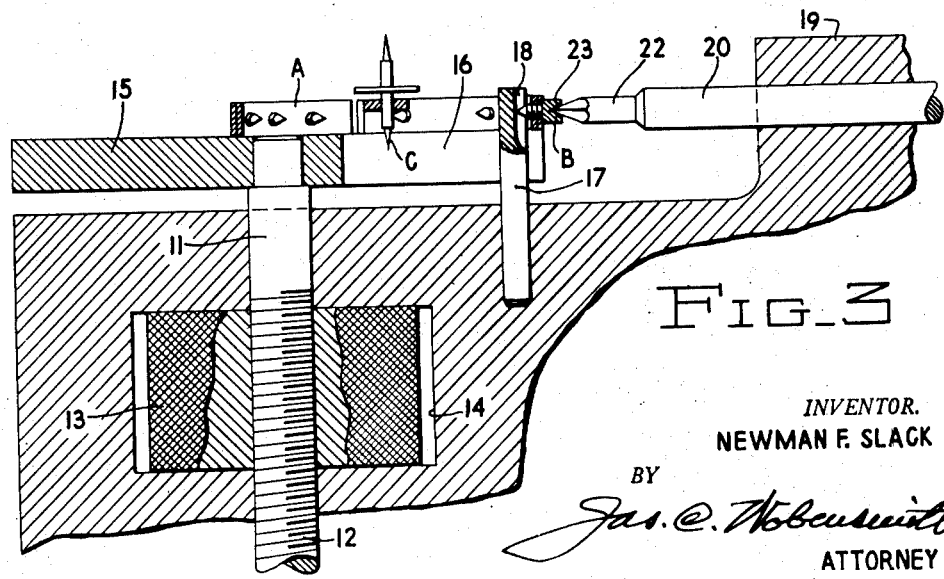
*INVENTOR.*
NEWMAN F. SLACK
BY
*Jas. C. Hobensmith*
ATTORNEY Patented Oct. 27, 1953

2,656,741

UNITED STATES PATENT OFFICE 2,656,741

WATCHMAKER'S TOOL

Newman F. Slack, Philadelphia, Pa.

Application April 6, 1950, Serial No. 154,225

2 Claims. (Cl. 77—26)

This invention relates to a watchmaker's tool, and it relates more particularly to a device for poising the balance wheels of watches by the removal of metal from the head portions of balance weight screws which are mounted in the rims of the balance wheels.

Heretofore, the customary method of poising a balance wheel was to first remove the same from the watch, and then placing the same on a pedestal to observe the heavy side, then removing the weight screw at the heavy point, and undercutting the metal from the base of the head portion of the balance weight screw, after which the weight screw was replaced in the balance wheel and the same again tested for poise. Sometimes it required a number of repeated cutting operations, each involving the removal and replacement of the balance weight screw in the rim of the balance wheel to effect the poising thereof.

In recent years it has been suggested to remove the metal from the outer portion of the head of the balance weight screw without removing the same from the balance wheel, which operation, however, involved the risk of distorting the rim of the balance wheel when the necessary pressure is applied through the cutting tool.

The principal object of the present invention is to provide a simple and efficient tool by means of which the poising of balance wheels for watches may be greatly facilitated.

A further object of the invention is to provide a tool of the character aforesaid, which may be readily mounted upon or removed from a watchmaker's bench, which is so constructed and arranged as to permit the expeditious removal of the metal from the outer portion of the head of a selected balance weight screw without any likelihood of distorting the balance wheel.

A further object of the present invention is to provide a tool of the character aforesaid, which can be adjusted quickly and easily to balance the weight screws of wheels of different rim widths.

The nature and characteristic features of the present invention will be more readily understood from the following description, taken in connection with the accompanying drawing forming part hereof, in which:

Figure 1 is a top or plan view of a watchmaker's tool embodying the main features of the present invention;

Fig. 2 is a front elevation thereof; and

Fig. 3 is an enlarged longitudinal sectional view of a portion of the structure shown in Figs. 1 and 2, the section being taken approximately on the line 3—3 of Fig. 1.

It should, of course, be understood that the description and drawing herein are illustrative merely, and that various modifications and changes may be made in the structure disclosed without departing from the spirit of the invention.

Referring to the drawing, 5 is a portion of a watchmaker's bench to which a bracket plate 6 is secured by means of screws 7. The bracket 6 is provided with apertures 8 for the reception of pins 9 which extend downwardly from the main frame 10 of the tool proper, the upper ends of the pins 9 being secured in the frame 10 in any suitable manner.

A vertical pin 11 is slidably mounted in frame 10 and the lower portion of said pin 11 is threaded as at 12. A knurled nut 13 is mounted on the threaded portion of the pin 11 and is located in a recess 14 in the frame 10 with its upper and lower faces bearing against complemental surfaces at the top and bottom of the recess 14.

The upper end of the pin 11 carries a table 15, the arrangement being such that the table 15 may be raised and lowered by the rotation of the knurled nut 13 upon the threaded portion 12 of the pin 11. The top surface of the table 15 serves as a means for supporting the balance wheel A in position to be operated on by the cutting tool to be hereinafter described.

The table 15 is provided with a radial slot 16. Near the periphery of the table 15 a vertical pin 17 is provided, a portion of which pin is positioned in an enlargement of the slot 16. The lower end of pin 17 is fixed in a portion of the frame 10, and the upper end of said pin 17, on the side most remote from the axis of the table 15, is provided with a vertical recess or groove 18, which is adapted to receive the inner end of the balance weight screw which is to be operated on by the tool.

At the end of the frame 10, most remote from the axis of the table 15, there is provided in an upwardly extending portion 19 of the frame 10 in which the spindle 20 of the cutting tool is slidably and rotatably mounted. The outer end of the spindle 20 of the cutting tool is provided with an enlarged knurled portion 21 for the manual operation of the cutting tool in a manner to be presently described.

The inner end of the spindle 20 of the cutting tool is preferably reduced in diameter, as at 22, and the end thereof is ground to provide a plurality of cutting edges 23 terminating in a point.

It should be noted that the axis of the spindle 20 of the cutting tool, and the axis of the pin 17, which provides a support for the inner end of the balance weight screw B, are disposed in a common plane and, preferably also, the axis of the pin 11 which carries the table 15 is disposed in the same plane.

The operation of the tool may now be explained. When it has been determined in the usual manner which balance weight screw is located at the heavy point at the balance wheel, the balance wheel is then placed upon the table 15 with the inner end of the aforesaid screw B positioned within the recess or groove 18 at the upper end of the pin 17.

The downwardly projecting portion C of the staff of the balance wheel is meanwhile disposed within the slot 16. The knurled nut 13 is then manipulated to raise or lower the top of the table 15, as may be required to bring the central axis of the balance weight screw, which is to be operated upon, in alinement with the axis of the spindle 20 of the cutting tool.

The spindle 20 is then manually pushed inwardly and rotated by the operator to cause the sharpened edges at the front end of the cutter spindle to remove the metal, leaving a hole of conical form in the center of the head of the balance weight screw operated upon.

It will be noted that the usual slot in the head of the balance weight screw will assist in guiding the cutter during the cutting operation.

It will also be noted that, when pressure is imparted to the spindle 20 of the cutter tool, there will be no strain imparted to any part of the balance wheel other than upon the head of the screw which is being operated on by the cutting tool, hence there will be no tendency to deform the balance wheel and thus change its periodicity.

It will further be noted that, in the use of the tool, if upon test, after the cutting action has taken place it is found that an insufficient amount of metal has been removed, the balance wheel may be readily repositioned on the table top, an additional amount of metal taken from the head of the weight screw and in such repeated operation there will be no necessity for adjusting the height of the table top after the same is initially set for a particular balance wheel.

I claim:

1. A watchmaker's tool comprising a frame, a pin vertically adjustable in said frame, a table carried at the upper end of said pin having a flat upper face adapted to receive and support a balance wheel thereon, a supporting pin mounted in the frame and extending upwardly through the edge portion of said table and beyond the upper face thereof, said supporting pin having a recess on one side thereof adapted to receive and support the inner end of a weight screw of a balance wheel placed upon the table, a cutter spindle rotatably and slidably mounted in a portion of the frame, said spindle having a knurled portion at one end thereof for manual actuation and cutting edges at the other end thereof terminating in a point, and the supporting pin and cutter spindle being disposed in a common vertical plane, the arrangement being such that when a balance wheel is placed upon the upper face of the table and the inner end of a balance weight screw thereof is disposed in the recess in the screw supporting pin the cutting end of the spindle may be pressed inwardly and rotated to remove metal from the central portion of the outer part of the head of the balance weight screw.

2. A watchmaker's tool comprising a frame, a table vertically adjustable with respect to said frame and having a flat horizontal upper face adapted to receive and support a balance wheel thereon, a supporting pin extending upwardly in association with a portion of said table and beyond the upper face thereof, a spindle rotatably and slidably mounted in a portion of the frame, said spindle having cutting edges at the inner end thereof, the supporting pin and cutter spindle being disposed in a common vertical plane, and the supporting pin having a recess on the side thereof toward the inner end of the spindle, said recess being adapted to receive the inner end of a weight screw of the balance wheel, the arrangement being such that when the balance wheel is placed on the upper face of the table, and the inner end of a balance weight screw thereof is disposed in the recess in the supporting pin, the cutting end of the spindle may be pressed inwardly and actuated to remove metal from the head portion of the balance weight screw.

NEWMAN F. SLACK.

References Cited in the file of this patent

UNITED STATES PATENTS

| Number | Name | Date |
| --- | --- | --- |
| 357,398 | Marsh | Feb. 8, 1887 |
| 1,228,053 | Sanford | May 29, 1917 |
| 1,491,523 | Ekstrom | Apr. 22, 1924 |
| 1,498,879 | Lofland | June 24, 1924 |